United States Patent [19]

Nakamura et al.

[11] Patent Number: 5,176,111
[45] Date of Patent: Jan. 5, 1993

[54] RADIATOR AND MOUNTING ARRANGEMENT FOR A MOTORCYCLE

[75] Inventors: Kimiaki Nakamura; Masaki Takegami, both of Iwata, Japan

[73] Assignee: Yamaha Hatsudoki Kabushiki Kaisha, Iwata, Japan

[21] Appl. No.: 834,475

[22] Filed: Feb. 12, 1992

[30] Foreign Application Priority Data

Feb. 22, 1991 [JP] Japan .................. 3-50411

[51] Int. Cl.⁵ .............................. F01P 9/00
[52] U.S. Cl. .................. 123/41.01; 123/41.51; 180/229
[58] Field of Search ........... 180/229; 165/41, 44, 165/51; 123/41.01, 41.49, 41.51, 41.57

[56] References Cited

U.S. PATENT DOCUMENTS

| 4,478,306 | 10/1984 | Tagami ............... | 180/229 |
| 4,564,581 | 1/1986 | Hamane et al. ....... | 180/229 |

FOREIGN PATENT DOCUMENTS

| 58-211519 | 12/1983 | Japan ............... | 123/41.51 |
| 64-29612 | 1/1989 | Japan ............... | 123/41.51 |

OTHER PUBLICATIONS

Patent Abstracts of Japan. vol. 6, No. 134(M-144)(1012) Jul. 21, 1982 & JP-A-57 058 511 (Yamaha Hatsudoki K.K.) Apr. 8, 1982.
P.A. of Japan vol. 8, No. 274 (M-345) Dec. 14, 1984 & JP-A-59 143 721 (Honda Giken Kogyo K.K.) Aug. 17, 1984.
P.A. of Japan vol. 7, No. 141(M-223) Jun. 21, 1983 and JP-A-58 053 624 (Honda Giken Kogyo K.K.) Mar. 30, 1983.
P.A. of Japan vol. 14, No. 473(M-1035)(4416) Oct. 16, 1990 & JP-A-2 190 223 (Nippon Denso Co., Ltd.) Jul. 26, 1990; JP-A-58 053 624 (Honda Giken Kogyo K.K.) Mar. 30, 1983.
P.A. of Japan vol. 14, No. 473(M-1035)(4416) Oct. 16, 1990 & JP-A-2 190 223 (Nippon Denso Co., Ltd.) Jul. 26, 1990.

Primary Examiner—Noah P. Kamen
Attorney, Agent, or Firm—Ernest A. Beutler

[57] ABSTRACT

A water cooled motorcycle wherein a curved radiator is disposed behind the steering shaft and inclined substantially at the same angle as the steering shaft so as to provide adequate air flow through the radiator without the engine heat being transmitted from the external portion of the engine to the radiator. Other embodiments disclose the use of lower radiators and series or parallel flow paths between the upper and lower radiators.

26 Claims, 5 Drawing Sheets

RADIATOR AND MOUNTING ARRANGEMENT FOR A MOTORCYCLE

BACKGROUND OF THE INVENTION

This invention relates to a motorcycle and more particularly to an improved arrangement for locating the radiator and cooling components of a motorcycle.

It is well known that, for a variety of reasons, either fully or partially water cooled internal combustion engines are being employed for powering motorcycles. Although liquid cooling systems for motorcycles have advantages, there is also a difficulty in where the heat exchanging radiator for the engine cooling system is positioned. In one form of radiator mounting arrangement, the cooling radiator is mounted rearwardly of the steering shaft and at least in part behind the front wheel of the motorcycle. The radiator may be inclined slightly from the vertical so as to maintain a lower profile for the radiator. However, when a radiator is positioned low in the motorcycle it tends to be in line with and juxtaposed to the engine. Hence, heat may be transferred back into the radiator for the engine and this diminishes the cooling capacity of the radiator and dictates the use of larger radiators, which is undesirable.

In addition to the heat exchange between the engine and the radiator, there is also a problem in providing adequate flow of air across the radiator. If the radiator is disposed to the rear of the front wheel or at least partially behind the front wheel the wheel and fender will block the air flow across the radiator. Also, if the radiator is mounted at a higher level and the motorcycle has any body faring whatsoever, the body faring can interfere with the air flow across the radiator.

It is, therefore, a principal object to this invention to provide an improved cooling system and radiator positioning arrangement for a motorcycle.

It is a further object to this invention to provide a radiator and mounting structure for a motorcycle that permits good cooling efficiency and also a compact configuration.

With the heat exchanger or radiator, there is normally a core for the radiator and a pair of header tanks at either the sides or top and bottom of the radiator depending upon whether the radiator is cross flow or down flow. Of course, the cross sectional area of the core will determine to a large extent the heat rejected capacity of the radiator. Although it is desirable to employ a large cross sectional area for the core, if this is done either the width or height of the radiator may become excessive and present a problem in conjunction with motorcycle applications.

It is, therefore, a further object to this invention to provide an improved radiator construction for a motorcycle that has a large cross sectional core but which does not have substantial height or width.

In connection with the provision of liquid cooling systems for motorcycles, it has also been the practice to employ more than one radiator for heat exchange from the engine cooling jacket to the atmosphere. However, the previously proposed systems have provided parallel flow through the radiators in many instances and hence maximum cooling efficiency has not been achieved.

It is, therefore, a still further object to this invention to provide an improved arrangement for circulating the coolant through plural radiators of a motorcycle cooling system.

SUMMARY OF THE INVENTION

A first feature of this invention is adapted to be embodied in a cooling system for a motorcycle having a body assembly suspended upon a dirigible front wheel and a rear wheel. A steering shaft is rotatable about an upstanding axis inclined from the vertical in a generally rearwardly inclined fashion and disposed above the front wheel for steering the front wheel. An internal combustion engine is supported by the body assembly and drives at least one of the wheels. The engine is at least in part water cooled. A radiator is supported contiguous to and to the rear of the steering shaft and has its core inclined to the vertical at substantially the same angle as the steering shaft.

Another feature of the invention is adapted to be embodied in a cooling system for a motorcycle having a body assembly suspended upon a dirigible front wheel and a rear wheel. A steering shaft is rotatable supported about an upstanding axis inclined from the vertical in a generally rearwardly inclined fashion and disposed above the front wheel for steering the front wheel. An internal combustion engine is supported by the body assembly and drives at least one of the wheels. The engine is at least partially water cooled. In accordance with this feature of the invention, a first radiator is supported contiguous to and to the rear of the steering shaft and a second radiator is disposed below the first radiator and means circulate coolant through the radiators from the engine cooling jacket.

DETAILED DESCRIPTION OF THE PREFERRED EMBODIMENT OF THE INVENTION

Figure 1:
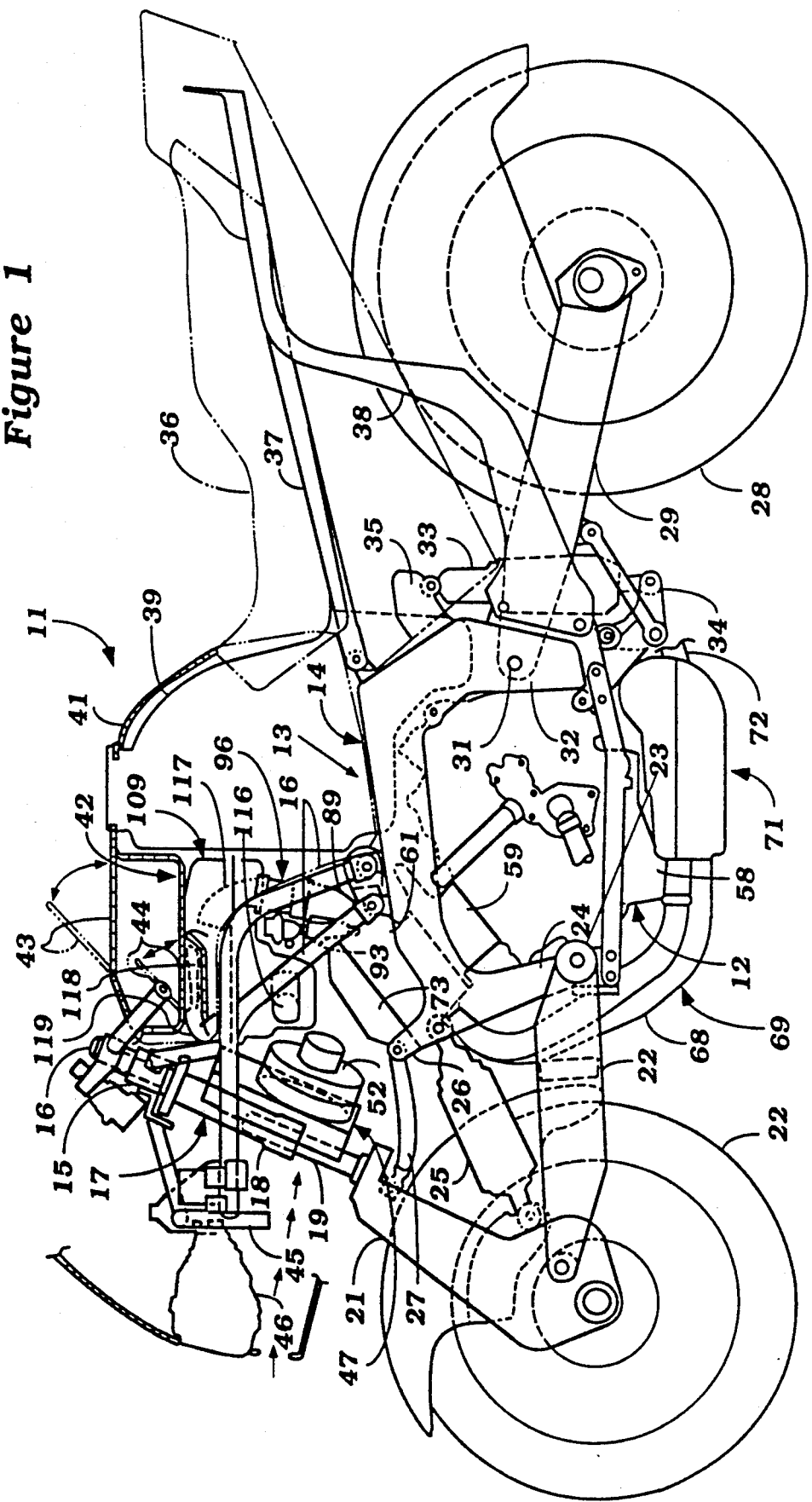
FIG. 1 is a side elevational view of a motorcycle constructed in accordance with an embodiment of the invention, with a portion broken away.
Figure 2:
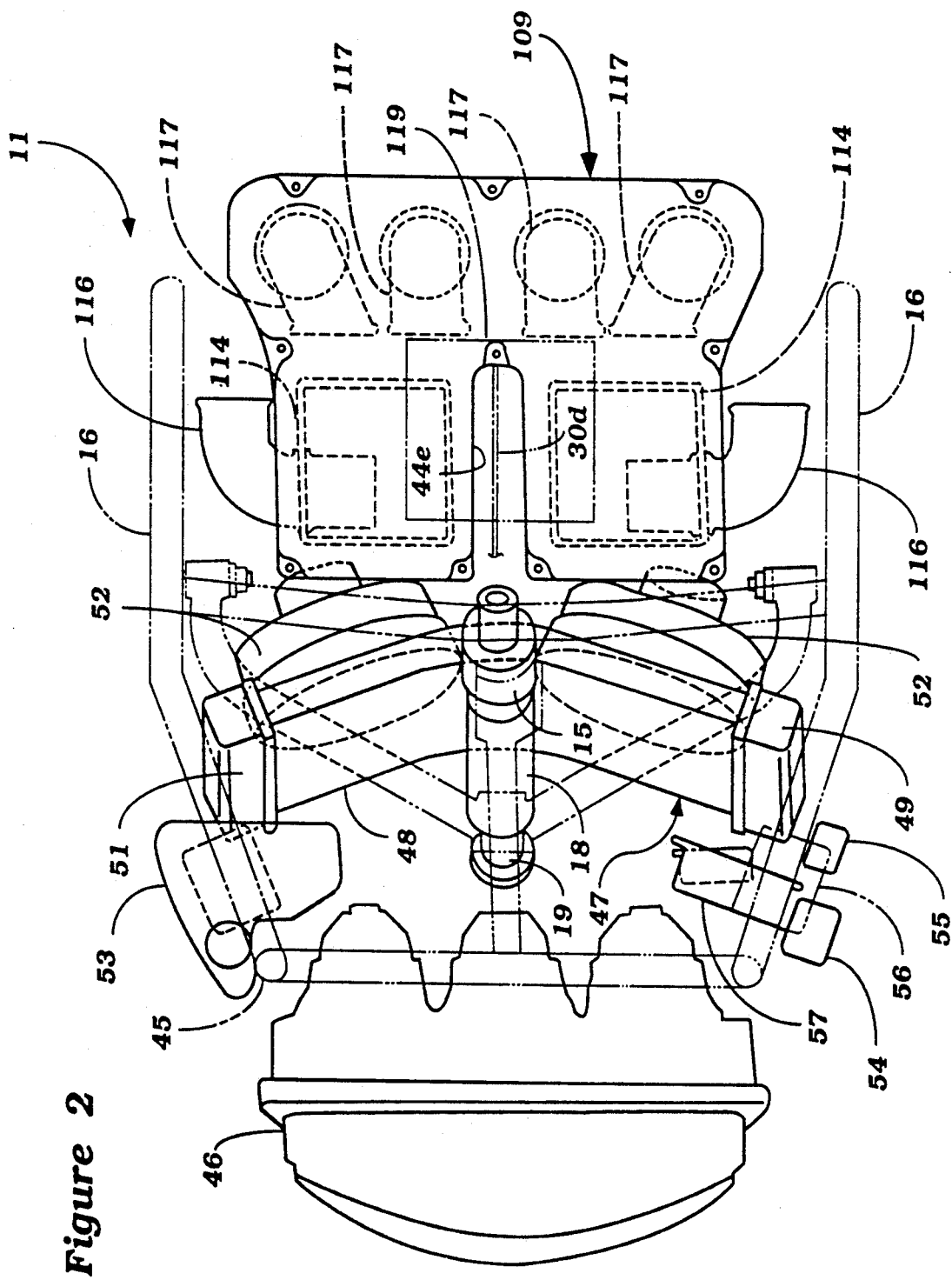
FIG. 2 is an enlarged top plan view of the motorcycle with portions of the body removed to more clearly show the orientation of the engine relative to the frame.

Referring now in detail to the drawings and initially to FIGS. 1 and 2, a motorcycle is depicted and is identified generally by the reference numeral 11. The motorcycle 11 is powered by an internal combustion engine which is constructed in accordance with an embodiment of the invention and which is identified generally by the reference numeral 12. Although the engine 12 is depicted as powering the motorcycle 11, it will be readily apparent to those skilled in the art that the engine may be employed in conjunction with other applications. The invention, however, has particular utility in conjunction with motorcycles because the invention provides a very compact yet highly efficient engine cooling system and compactness is particularly important with motorcycles for obvious reasons.

The motorcycle 11 includes a frame assembly, indicated generally by the reference numeral 13, which includes a pair of side frame members 14 that have a generally inverted U shape. A head pipe 15 is supported from the frame members 14 by means of head brackets 16. The head pipe 15 journals a handlebar assembly 16 that is connected to a steering shaft, indicated generally by the reference numeral 17, which is also supported for rotation by the head pipe 15 and which is comprised of upper and lower portions 18 and 19 which have a splined connection so as to permit axial movement between these members. The lower steering shaft member 19 is connected to a front wheel bracket 21 which, in turn, journals a front wheel 22 for rotation and steering movement. The front wheel bracket 21 is carried at the forward end of a leading front arm 22 that is journaled at its rear end by means of a pivot 23 formed at a lower end 24 of the frame members 14. The front arm 22 has an H-shaped configuration in top plan view.

A suspension element 25 is loaded between the arm 22 and an upper portion 26 of the frame members 14 for cushioning the suspension movement of the front wheel 22 relative to the frame assembly 13. An upper link 27 further controls the suspension movement of the front wheel 22. The front wheel suspension may be of any known type and, since the invention deals primarily with the construction of the engine 12 and its cooling system, a further description of the front wheel suspension and steering mechanism is not believed to be necessary to understand the operation of the invention.

A rear wheel 28 is supported by a trailing arm assembly 29 that has a front pivotal connection 31 to the rear depending portions 32 of the frame members 14. A suspension element 33 cushions the suspension movement of the rear wheel 28 and is loaded by means of a linkage system 34 connected between the frame members 14 and the trailing arm 29. The opposite portion of the suspension element 33 is affixed to a bracket 35 carried by the frame members 14.

A seat, shown in phantom and identified by the reference numeral 36, is disposed at least in part over the rear wheel 28 and is carried by means of a pair of seat rails 37 and seat pillars 38 which are affixed to the respective rear portions of the frame side members 14.

A fuel tank 39 is disposed forwardly of the seat 38 and supplies fuel to the engine 12 in a manner which will be described. The fuel tank 39 is at least partially enclosed by a tank cover 41 which may form a portion of the body of the motorcycle. Forwardly of the tank cover 41 there is provided a glove box 42 that is accessible through a pivotally supported access lid 43. The glove box 42 is disposed rearwardly of the head pipe 15. A further access door 44 is provided in the lower surface of the glove box 42 for accessing a control box (to be described) for electronically controlling certain components of the engine such as its fuel injection system and its ignition system.

The head pipe brackets 16 further carry a headlight bracket 45 that extends transversely across the front of the frame assembly 13 and which mounts a headlight 46 in a forward position.

As will be described, the engine 12 is water cooled and there is provided a generally curved radiator assembly, indicated generally by the reference numeral 47, which is disposed so that its bight lies to the rear of the head pipe 15 and its sides extend around the steering shaft 17 and forwardly thereof. The radiator 47 has a core 48 and a pair of header tanks 49 and 51 so as to provide a cross flow action. Water is circulated through the radiator 47 from the cooling jacket of the engine 12 in a manner which will be described. A pair of electric blowers 52 are mounted by the frame assembly 13 to the rear of the core 48 for cooling purposes. Air is drawn across the radiator 47 through an inlet opening formed in a front body portion as shown by the arrows in FIG. 1.

Various auxiliaries are supported around the radiator 47 by the headlight bracket 45 and these include a water recovery tank 53, electrical relays 54 and 55, an ignition coil 56 and a fuse box 57.

Now to the construction of the engine 12, as is typical with motorcycle practice, the engine 12 includes a crankcase transmission assembly 58 that contains the crank shaft of the engine 12 and a change speed transmission which drives the rear wheel 28 in an appropriate manner through either a shaft or chain drive (not shown). A cylinder block 59 extends upwardly and is inclined in a forward direction from the crankcase transmission assembly 58 and has, in the illustrated embodiment, four aligned cylinder bores that are transversely disposed across the motorcycle 11 so that the output shaft or crank shaft of the engine 12 also extends transversely, as is typical in motorcycle practice. Although the invention is described in conjunction with an in-line four cylinder engine, it should be readily apparent to those skilled in the art how the invention can be practiced in conjunction with engines having other cylinder numbers and other cylinder configurations. Also, although the invention has particular utility in conjunction with multiple cylinder engines, certain facets of the invention may be employed in conjunction with single cylinder engines.

Figure 3:
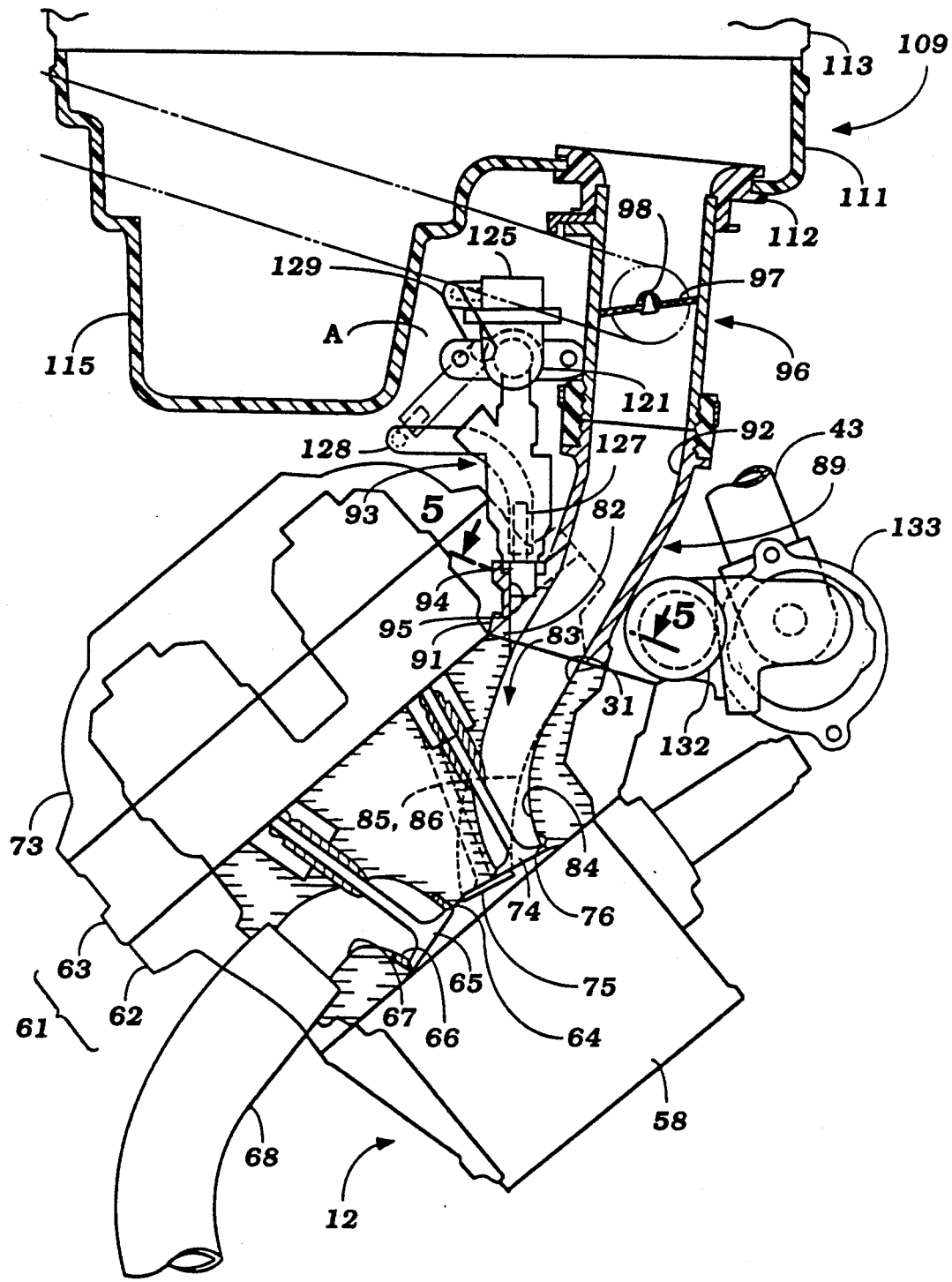
FIG. 3 is a further enlarged side elevational view of the upper portion of the engine with portions shown in cross section.

Referring now additionally to FIG. 3, the cylinder block 58 is shown in side elevation since the internal construction of the cylinder bores, pistons, connecting rods, etc. may be conventional and, for that reason, a description of them is not believed to be necessary. However, a cylinder head assembly, indicated generally by the reference numeral 61 and which is comprised of a lower cylinder head portion 62 and an upper cam carrier portion 63, is affixed to the cylinder block 58 in a suitable manner. The cylinder head 62 is shown in cross section so as to illustrate the induction system and the exhaust system and particularly the induction system associated with a single of these cylinders.

It will be noted that the cylinder head 62 has a recess 64 which forms in part the combustion chamber with the cylinder bore and piston which, as has been noted, are not illustrated because they may be of any conventional type. The cylinder head assembly 61 is of the five valve type; that is, it includes three intake valves and two exhaust valves for each cylinder. The paired exhaust valves are not shown, but a single of these valves appears in FIG. 3 and is identified generally by the reference numeral 65. The valves 65 each cooperate with valve seats 66 formed at the base of a pair of exhaust passages 67 which extend from these valve seats to either a single or a Siamese type exhaust port in the side of the cylinder head 62. An exhaust manifold 68 has collector sections that cooperate with each o these exhaust ports and forms a portion of an exhaust system, indicated generally by the reference numeral 69. The exhaust manifold 68 extends forwardly and downwardly and then turns beneath the engine to deliver the exhaust gases to a muffler/catalyzer assembly 71 which is positioned beneath the transmission crankcase assembly 58. The exhaust gases are then discharged to the atmosphere through an exhaust system including one or more tail pipes 72.

The exhaust valves 65 are disposed in generally side by side relationship on one side of a plane containing the cylinder bore axis. The valves 65 are disposed at an acute angle to this plane and are operated by means of an overhead cam shaft that is contained within a cam cover 73 that is affixed to the cylinder head assembly 61 in any known manner.

Disposed on the other side of this plane are three intake valves comprised of a center intake valve 74 and a pair of side intake valves 75. The center intake valve 74 is disposed at a lesser acute angle to the aforenoted plane than the exhaust valves 65 while the side intake valves 75 are disposed at a greater angle to this plane than the exhaust valves 65 with the intake valves 75 being disposed at the same angle to this plane. The intake valves 74 and 75 are also operated directly by means of an intake cam shaft that is journaled in the cylinder head assembly in the cam carrier 63 and which is covered by the cam cover 73. The intake and exhaust cam shafts are driven from the engine output shaft in any known manner and rotate about axes that are parallel to the axis of rotation of the engine output shaft.

A charge is delivered to the intake valves 74 and 75 for admission to the combustion chamber which, as aforenoted, is defined in part by the cylinder head recess 64. It should also be noted that the side intake valves 75 may have their head portions extending slightly over the aforenoted plane when the valves ar all in their closed position. The induction system and the configuration of the intake passages that serve the valve 75 and 76 is described in full detail in the co-pending application entitled "Air Intake System For A Fuel Injection Type Four Cycle Engine". Ser. No. 07/834,474, filed Feb. 12, 1992, and assigned to the Assignee hereof the disclosure of which is incorporated herein by reference.

The induction system includes a Saimese type of intake passage 83 that extends from an inlet opening 81 formed in the cylinder head surface 82 and terminates at the valve seats with which the valves 75 and 76 cooperate. These passages appear in part in FIG. 3 and are identified by the references numerals 84, 85 and 86.

An intake manifold, indicated generally by the reference numeral 89, has a flange portion 91 that is affixed to the cylinder head 62 in mating relationship with the cylinder head surface 82. The intake manifold 89 has a plurality of individual runners 92 that form a continuation of the inlet portion of the individual intake passages 83 extending from their inlet openings 81 in a generally upward direction. As installed in the motorcycle 11, the manifold runners 91 extend in a generally vertical direction.

A plurality of individual fuel injectors 93, one for each cylinder, which may be of the electrically operated type actuated by an electrical solenoid valve are mounted with their discharge nozzles 94 extending into a recess 95 of the manifold 89 adjacent each runner 92 and configured relative to the runners and intake passages 83 as described co-pending application Ser. No. 07/834,474. It should be noted that the fuel injectors 93 are disposed so that their nozzle portions 94 are offset toward the center of the center intake port. The fuel injectors 93 are set so that their spray axis will extend perpendicularly to a line and toward the center of the center intake passage portion 84. The disposition is such that the fuel injectors 93 will spray fuel equally to each of the intake passage portions 84, 85 and 86 so as to provide uniform mixture strength entering the combustion chamber recesses 64.

A throttle body assembly, indicated generally by the reference numeral 96, is affixed to the upper end of the intake manifold 89 and journals a plurality of throttle valves 97 each affixed to a throttle valve shaft 98. The throttle bodies 96 are each individual elements that are suitably connected together. Alternatively, a single piece assembly may be employed if desired. In addition, connectors interconnect the throttle valve shafts 98 of the respective throttle bodies, assuming that separate assemblies are employed. The connectors ensure that the throttle valves 97 will all be operated in unison.

A throttle control lever is affixed to the throttle valve shaft 98 and is operated by means of a wire actuator (not shown).

Referring now additionally to FIG. 2, an air inlet device, indicated generally by the reference numeral 109, is provided for supplying a filtered and silenced supply of air to the throttle bodies 96. The air inlet device 109 has a generally box-like configuration and is comprised of a lower member 111 that has gasketed openings 112 that are received on the upper ends of the throttle bodies 96 and supply air thereto. An upper member 113 encloses the air inlet device 109. The air inlet device 109 is divided into two box-like chambers across which respective filter elements 114 extend. Air is delivered from the atmosphere to these box portions, which are indicated generally by the reference numeral 115, by means of a pair of rearwardly facing inlet ducts 116 which lie beneath the glove box 42 (FIG. 1).

The filtered air then flows upwardly and can enter the throttle bodies 96 through elbow-like air trumpets 117 which are affixed to the throttle bodies within the air box 109.

It should be noted that the air boxes 115 and the throttle bodies 96 define a recessed area. It is into this recessed area that the fuel injectors 93 extend and hence, the fuel injectors 93 will be in fact concealed and enclosed by the intake manifold 89, throttle bodies 96 and air inlet device 109. As a result of this confinement, any noise generated by the opening and closing of the injector valves and the actuation by the solenoids associated therewith will be well dampened and this noise will be silenced from the rider.

As may be seen in FIG. 1, the upper portion 113 of the air box 109 is provided with a recess 118 in its upper surface in which the control box 119, afore referred to, is positioned. The control box 119 controls the components of the engine such as the injection system and ignition system and is accessible, as aforenoted, by the access door 44 in the base of the glove box 42.

Figure 4:
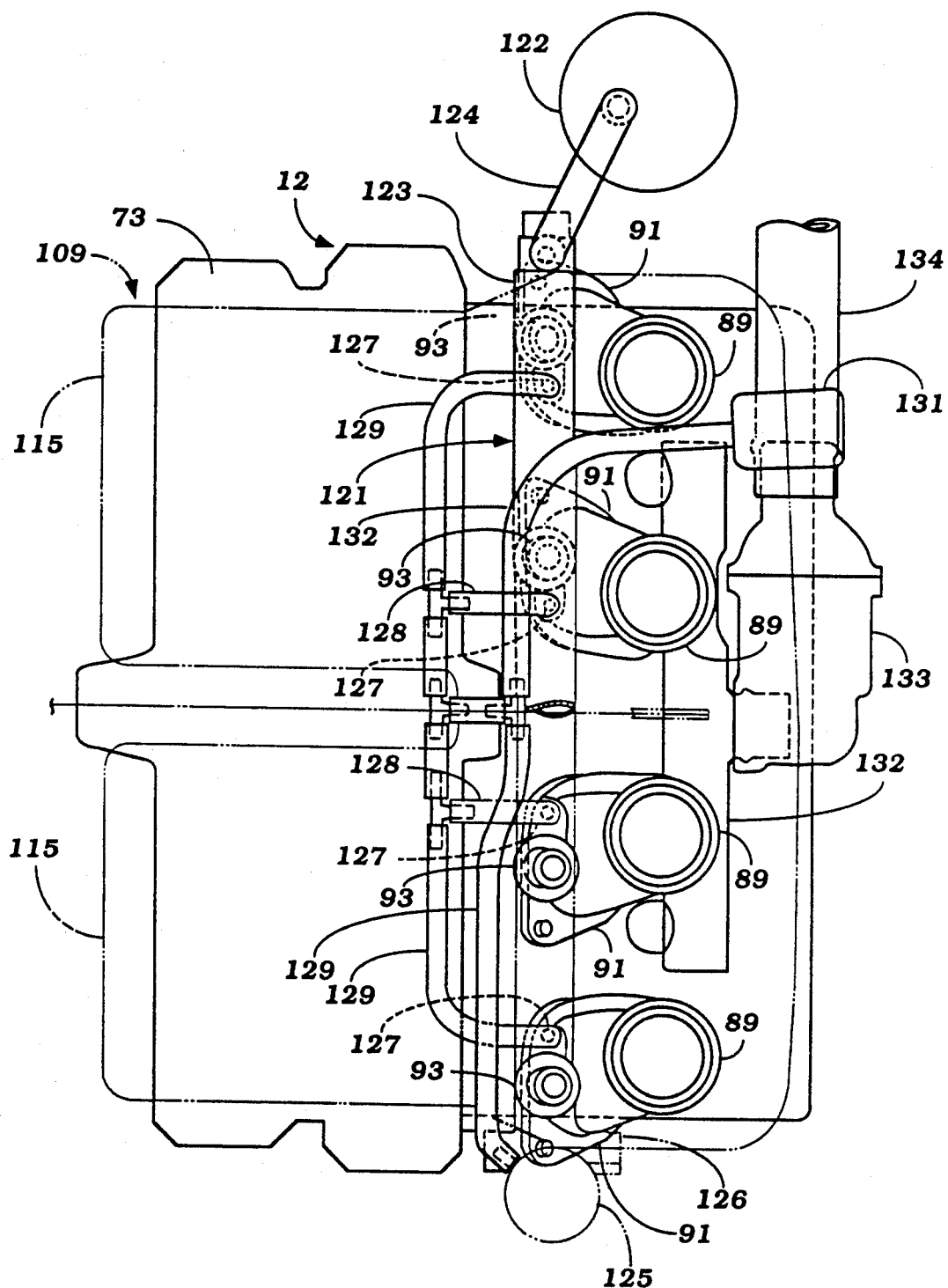
FIG. 4 is a top plan view of the engine looking in the same direction as FIG. 2 with the air induction system removed so as to more clearly show the relationship of components of the induction system.

A fuel manifold or fuel rail 121 has suitable nipples to receive the fuel inlet portions of the fuel injectors 93 (FIG. 4). Because of the afore described configuration, the fuel injectors 93 may be disposed so that their longitudinal axes are parallel to each other and this permits the use of a straight line fuel rail and manifold 102. Fuel is delivered to the fuel rail 121 from the fuel tank 39 under the pressure from a fuel pump (not shown) which, in turn, delivers the fuel to a fuel filter 122 which, in turn, supplies an inlet end 123 of the fuel rail 121 through a conduit 124. A pressure regulator 125 is disposed at the opposite end of the fuel rail and is mounted to a bracket 126 formed at this end. The fuel pressure regulator 125 maintains the desired fuel pressure in the fuel rail 121 for supply to the injectors 93 by by-passing excess fuel back to the fuel tank 39 through a suitable conduit.

The intake manifold 89 is provided with a plurality of vacuum pressure sensor ports 127 in their flange portions 91. Conduits 128 and 129 supply this pressure signal to both the fuel pressure regulator 125 via a conduit 129 and to a pressure sensor 131 via a conduit 132. The pressure sensor 131 supplies this pressure signal to the control box 119 for controlling the engine in the desired strategy.

A portion of the engine cooling system appears in FIG. 3 and this includes a water manifold 132 that is affixed to the back side of the cylinder head 62 and which communicates with a thermostat assembly 133 for returning coolant to the radiator header tank 51 through a flexible conduit 134.

Figure 5:
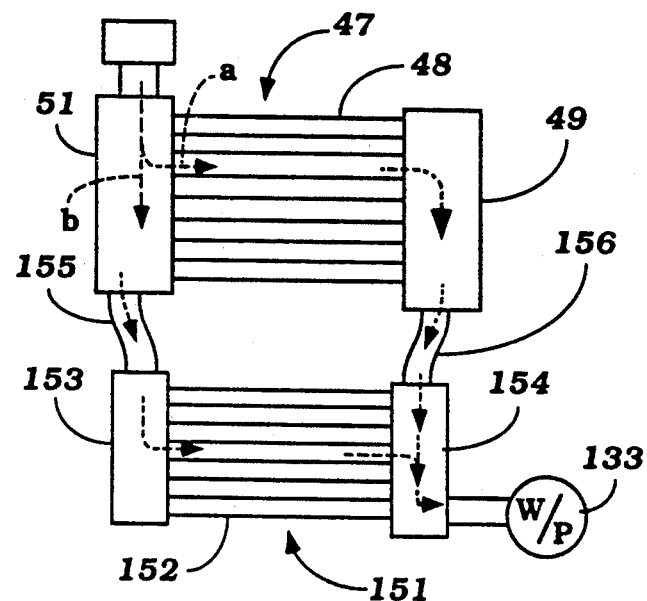
FIG. 5 is a partially schematic view showing another embodiment of this invention employing two cross flow radiators one above the other.

The cooling capacity of the motorcycle can be further improved by adding a second radiator disposed below the radiator 47. FIG. 5 shows such an embodiment and the second radiator in this embodiment is identified generally by the reference numeral 151 and may be positioned below the radiator 47 and at least in part to the rear of the front wheel 22. In this embodiment, the radiator 151 is of the cross flow type and has a core 152 and a pair of opposite header tanks 153 and 154. In this embodiment, the radiators 47 and 151 are disposed so that there is a parallel flow through them. Hence, a first conduit 155 connects the header tank 51 of the radiator 47 with the header tanker 153 of the radiator 151. A second conduit 156 connects the header tank 49 of the radiator 47 with the header tank 154 of the radiator 151. Hence, there is a parallel flow path as indicated by the arrows A and B in this figure. Although this arrangement may be satisfactory in some instances, it does not provide optimum cooling.

Figure 6:
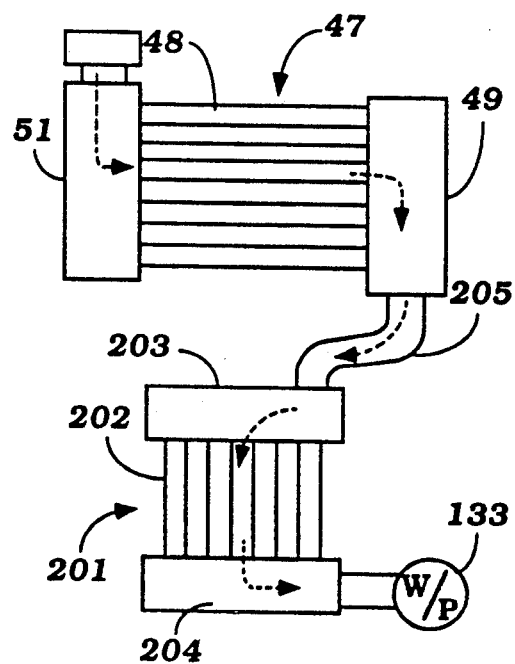
FIG. 6 is a partially schematic view, in part similar to FIG. 5, and shows an arrangement employing a cross flow radiator and a down flow radiator in series flow relationship.

FIG. 6 shows another embodiment of the invention that employs two radiators but in this embodiment optimum cooling can be achieved by providing series flow through the two radiators.

Referring now specifically to this embodiment, the second radiator is indicated generally by the reference numeral 201 and is of the down flow type including a core 202, an upper header tank 203 and a lower header tank 204. With such an arrangement, the radiator 201 may be positioned below the radiator 47 and on one side or the other of the steering shaft 17 and front wheel 22. In this way, none of the core 202 will be obstructed by the steering shaft or front wheel.

A conduit 205 connects the header tank 49 of the cross flow radiator 47 with the upper tank 203 of the radiator 201. Hence, there will be a series flow through the radiators 47 and 201 and greater cooling efficiency then with the parallel flow arrangement may be achieved.

It should be readily apparent that the foregoing embodiments provide extremely affective cooling arrangements for liquid cooled motorcycles. Because of the fact that the upper radiator 47 has a curved core this permits a greater surface area for the core in a given overall transverse dimension which is particularly usefle in conjunction with motorcycle applications for obvious reasons. Of course, the embodiments described are preferred embodiments of the invention and various changes and modifications ma be made without departing from the spirit and scope of the invention. as defined by the appended claims.

We claim:

1. A cooling system for a motorcycle having a body assembly suspended upon a dirigible front wheel and a rear wheel, a steering shaft rotatable about an upstanding axis inclined from the vertical in a generally rearwardly inclined fashion and disposed above said front wheel for steering said front wheel, an internal combustion engine supported by said body assembly and driving at least one of said wheels, said engine being at least partially water cooled, and a radiator supporting contiguous to and to the rear of said steering shaft through which coolant is circulated from said engine, said radiator having a core inclined to the vertical at substantially the same angle as the steering shaft and entirely forwardly of the rear portion of said front wheel lying at its center behind said steering shaft and above said front wheel.

2. A cooling system for a motorcycle as st forth in claim 1 wherein the radiator is a cross flow radiator.

3. A cooling system for a motorcycle as set forth in claim 2 wherein the cross flow radiator has a curved core and a pair of side tanks that are disposed generally in line with the steering shaft in the longitudinal direction.

4. A cooling system for a motorcycle as set forth in claim 3 comprising a cowling extending across the forward portion of the radiator.

5. A cooling system for a motorcycle as set forth in claim 4 further including a air inlet opening in said cowling for permitting air to flow across the radiator core.

6. A cooling system for a motorcycle as set forth in claim 5 further including coolant fan means for circulating cooling air across the radiator core.

7. A cooling system for a motorcycle as set forth in claim 6 wherein the cooling fan means comprises a pair of electrically driven cooling fans disposed on opposite sides of the steering shaft.

8. A cooling system for a motorcycle as set forth in claim 1 wherein the radiator has a curved configuration.

9. A cooling system for a motorcycle as set forth in claim 8 wherein the sides of the radiator viewed in front plan are aligned with the steering shaft in side elevation.

10. A cooling system for a motorcycle as set forth in claim 9 comprising a cowling extending across the forward portion of the radiator.

11. A cooling system for a motorcycle as set forth in claim 10 further including a air inlet opening in said cowling for permitting air to flow across the radiator core.

12. A cooling system for a motorcycle as set forth in claim 11 further including coolant fan means for circulating cooling air across the radiator core.

13. A cooling system for a motorcycle as set forth in claim 12 wherein the cooling fan means comprises a pair of electrically driven cooling fans disposed on opposite sides of the steering shaft.

14. A cooling system for a motorcycle as set forth in claim 1 comprising a cowling extending across the forward portion of the radiator.

15. A cooling system for a motorcycle as set forth in claim 14 further including a air inlet opening in said cowling for permitting air to flow across the radiator core.

16. A cooling system for a motorcycle as set forth in claim 15 further including coolant fan means for circulating cooling air across the radiator core.

17. A cooling system for a motorcycle as set forth in claim 1 further including a second radiator positioned to the rear of the steering shaft and below the first radiator and through which coolant is circulated along with the first mentioned radiator.

18. A cooling system for a motorcycle as set forth in claim 17 wherein the flow through the radiators is in a series fashion.

19. A cooling system for a motorcycle as set forth in claim 17 wherein the flow through the radiators is in parallel fashion.

20. A cooling system for a motorcycle as set forth in claim 17 wherein the first mentioned radiator is a cross flow radiator.

21. A cooling system for a motorcycle as set forth in claim 20 wherein the lower radiator is a down flow radiator.

22. A cooling system for a motorcycle as set forth in claim 21 wherein there is a series flow between the first mentioned radiator and the lower radiator.

23. A cooling system for a motorcycle as set forth in claim 20 wherein the lower radiator is a cross flow radiator.

24. A cooling system for a motorcycle as set forth in claim 23 wherein there is a parallel flow through the first mentioned radiator and the lower radiator.

25. A cooling system for a motorcycle as set forth in claim 1 wherein the body includes a head pipe journaling the steering shaft for rotation about the upstanding axis, a pair of head pipe brackets fixed relative to said head pipe and extending along opposite sides thereof and positioned outwardly of the sides of the radiator for attachment to the remainder of the body assembly.

26. A cooling system for a motorcycle having a body assembly suspended upon a dirigible front wheel and a rear wheel a steering shaft rotatable about an upstanding axis inclined from the vertical in a generally rearwardly inclined fashion and disposed above said front wheel for steering said front wheel, an internal combustion engine supported by said body assembly and driving at least one of said wheels, said engine being at least partially water cooled, a first cross flow radiator supported contiguous to and to the rear of said steering shaft, a second down flow radiator disposed below said first radiator, and means for circulating coolant first through said first radiator from one side to the other side therein and therein downwardly through said second radiator from said engine.

* * * * *